US008868718B1

(12) United States Patent
Vijendra et al.

(10) Patent No.: US 8,868,718 B1
(45) Date of Patent: Oct. 21, 2014

(54) METHOD AND APPARATUS FOR PROVIDING SCALABILITY IN RESOURCE MANAGEMENT AND ANALYSIS SYSTEMS

(75) Inventors: Sudhir Vijendra, White Plains, NY (US); Pankaj Batra, White Plains, NY (US)

(73) Assignee: EMC Corporation, Hopkinton, MA (US)

( * ) Notice: Subject to any disclaimer, the term of this patent is extended or adjusted under 35 U.S.C. 154(b) by 1579 days.

(21) Appl. No.: 11/476,957

(22) Filed: Jun. 28, 2006

(51) Int. Cl.
*G06F 15/173* (2006.01)
*G06F 15/16* (2006.01)
*H04L 12/24* (2006.01)

(52) U.S. Cl.
CPC .................................... *H04L 41/12* (2013.01)
USPC ........................... 709/224; 709/223; 709/230

(58) Field of Classification Search
USPC .................................................. 709/230, 224
See application file for complete search history.

(56) References Cited

U.S. PATENT DOCUMENTS

| | | | | |
|---|---|---|---|---|
| 5,506,838 A | * | 4/1996 | Flanagan | 370/258 |
| 5,528,516 A | * | 6/1996 | Yemini et al. | 702/181 |
| 6,026,442 A | * | 2/2000 | Lewis et al. | 709/229 |
| 6,108,702 A | * | 8/2000 | Wood | 709/224 |
| 7,203,742 B1 | * | 4/2007 | Luft et al. | 709/223 |
| 7,307,990 B2 | * | 12/2007 | Rosen et al. | 370/392 |
| 2002/0111755 A1 | * | 8/2002 | Valadarsky et al. | 702/58 |
| 2003/0046390 A1 | * | 3/2003 | Ball et al. | 709/224 |
| 2003/0212927 A1 | * | 11/2003 | Navar et al. | 714/47 |

OTHER PUBLICATIONS

MPLS—Webopedia.com, Published: Aug. 7th, 2002 http://web.archive.org/web/20030630102507/webopedia.com/TERM/M/MPLS.html.*

* cited by examiner

*Primary Examiner* — Noel Beharry
(74) *Attorney, Agent, or Firm* — Krishnendu Gupta; Joseph D'Angelo

(57) ABSTRACT

A method, apparatus and computer program product for providing scalability of a resource management and analysis system is disclosed. The method comprises the steps of receiving and storing information associated with each of a plurality of managed elements by the first system, determining a topology of the resource from the received managed element information, providing selected information regarding the resource topology from the first system to the second system, receiving at the second system information regarding status of the managed elements and the selected topology information and performing, at the second system, an analysis based on the received status information.

20 Claims, 9 Drawing Sheets

METHOD AND APPARATUS FOR PROVIDING SCALABILITY IN RESOURCE MANAGEMENT AND ANALYSIS SYSTEMS

RELATED FIELD

This application relates to the field of resource management and more specifically to providing methods for providing scalability in resource management and analysis systems.

BACKGROUND

A resource management and analysis system is typically used to manage (e.g., monitor and control) the operation of ever increasing networked systems and networks of networked systems. A distributed system (e.g., a computer or communication system) generally includes many individual components (e.g., nodes or devices), which may be implemented using both hardware and software elements. The individual devices, and the relationships between them, conventionally define the "topology" of a distributed system or similar resources, e.g., distributed applications.

A resource management system typically includes a plurality of agents that are assigned to a centralized manager. The agents of the resource management system are used to monitor, control, and otherwise influence the behavior of the devices or elements of the managed distributed system. These agents may be any suitable software or hardware element that is capable of collecting information, e.g., statistics, about the behavior of a device and/or enacting required changes to the device. Moreover, any number of the components in a distributed system may be associated with one or more agents, although each component for which monitoring and/or control is desired must be associated with at least one agent.

A centralized manager coordinates the operation of the agents in the resource management system. As is the case with agents, the centralized manager may be any suitable software or hardware element, although it must be capable of performing tasks required (or useful) to monitor or control a distributed system, such as analysis (performance or fault), configuration changes, etc. In many types of resource management systems, the agents run on or in the same network of the respective network devices they are monitoring and/or controlling while the manager remotely collects information from one or more agents to perform its task as a whole.

It is important to note that the agents are not required to be on the same network as the managed device or on the device itself. The distinction between the manager and the agent is in their functionality (e.g., monitoring, control, or analysis) rather than their location relative to the devices.

The resource management and analysis system may, in receiving information from the agents, may perform an analysis of the distributed system. For example, the agents may provide indicators of events occurring or detected in a corresponding network element to the resource management system and the resource management system may utilize this information to perform an analysis of the health and/or status of the network. A method and system that may be used to perform an analysis that described in commonly-owned U.S. Pat. Nos. 5,528,516; 5,661,668; 6,249,755; 6,868,367, and 7,003,433, the contents of which are incorporated by reference herein. The aforementioned US patents teach performing a system analysis based on a mapping of observable events and detectable events, e.g., symptoms and problems, respectively, to determine the cause of the detected events or indicators being generated. Impact analysis is a similar analysis that may be performed based on the information provided by the agents.

A limitation on the performance of resource management systems has traditionally been size of the network or the system being managed. Large systems, that have components or elements distributed over a wide geographic area, can present an unsustainable computational burden on the resource management system. One approach often used to alleviate the burden on the resource management system of a distributed system, and to thus improve scalability, is to create a distributed-architecture management system. In a distributed-architecture management system, a single, centralized, manager is replaced by a plurality of managers, each of which oversees a subset of the agents in the distributed system, network or resource. Each manager is associated with a respective partition or subset of the distributed architecture management system.

One method proposed for distributing the agents is described in commonly-owned U.S. patent application Ser. No. 11/952,395, entitled "Method and Apparatus for Arranging Distributed System Topology Among a Plurality of Network Managers," filed on Feb. 7, 2005, the contents of which are incorporated by reference, herein. As is described, the network is subdivided into an initial set of groups of managed elements. The subsequent formulation of the groups, and the associated agents, is determined in accordance with an iterative process. The process limits the number of managed entities for each agent to prevent the overburdening of any one agent in performing its management and analysis functions.

However, such distribution of the management and analysis function into a plurality of requires a further coordination of the information provided from each agent. The inclusion of this coordination requires addition processing capability in understanding the relationships between the different management agents and must be altered to accommodate the introduction of additional management agents and their relationships.

Hence, there is a need in the industry for a resource management and analysis system that provides for scalability of the resource management system capabilities while not requiring proportional increase and burdening the underlying elements of the resource management system.

SUMMARY OF THE INVENTION

A method, apparatus and computer program product for providing scalability of a resource management and analysis system is disclosed. The method comprises the steps of receiving and storing information associated with each of the managed elements by a first system, determining a topology of the distributed system from the received managed element information, providing selected information regarding the topology from the first system to a second system, receiving at the second system information regarding status of the managed elements and performing, at the second system, an analysis based on the received status information and the selected topology information.

BRIEF DESCRIPTION OF THE FIGURES

The above and further advantages of the present invention may be better under stood by referring to the following description taken into conjunction with the accompanying drawings in which.

Figure 1A:
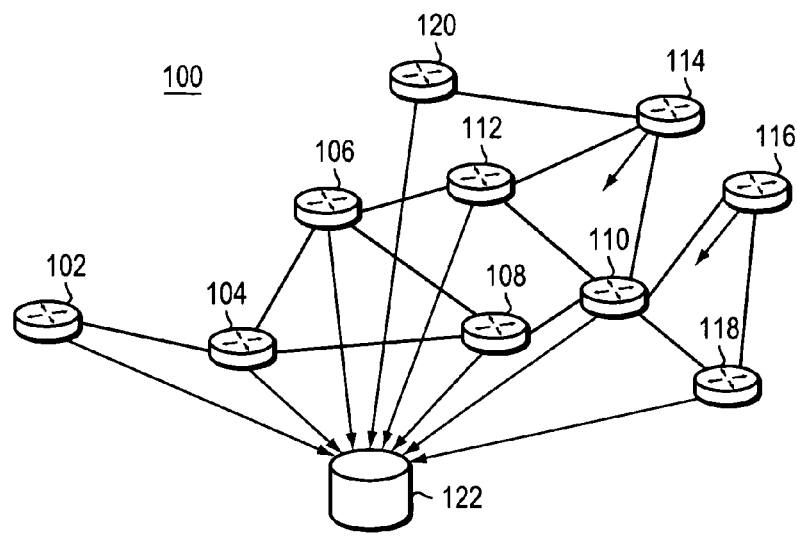
FIGS. 1A and 1B illustrate conventional networks and associated resource management systems.

It is to be understood that these drawings are solely for purposes of illustrating the concepts of the invention and are not intended as a definition of the limits of the invention. The embodiments shown in the figures herein and described in the accompanying detailed description are to be used as illustrative embodiments and should not be construed as the only manner of practicing the invention. Also, the same reference numerals, possibly supplemented with reference characters where appropriate, have been used to identify similar elements

DETAILED DESCRIPTION

FIG. 1A illustrates a conventional network system 100 composed of managed network elements 102-120, which communicate with each other via one or more network paths. It would be recognized that the elements illustrated are those that are managed by the management system and need not represent all the elements in the network. Information regarding each of the managed network elements is provided to a network management element 122. The network management element 122 collects and stores information or attributes of the managed elements. Although the network management element 122 is depicted external to the managed network elements, it would be recognized that the network management function may be performed on any one of the managed elements and the use of a separate element is merely to logically represent this function.

Provided with the attributes of the managed elements, the management element further determines the network topology by determining the organization of the network elements and their relationship to each other.

The resource management system further receives information regarding status of the managed elements. This status information may be received in response to a request made by the management system or may be autonomously provided by the managed element. The status may include monitored events that may occur in the managed element. The events may indicate degraded performance or failures of elements within the managed elements. Using the determined topology and the received status events, the management system 122 may perform an analysis as described in the previously referred-to commonly-owned US patents.

Figure 1B:
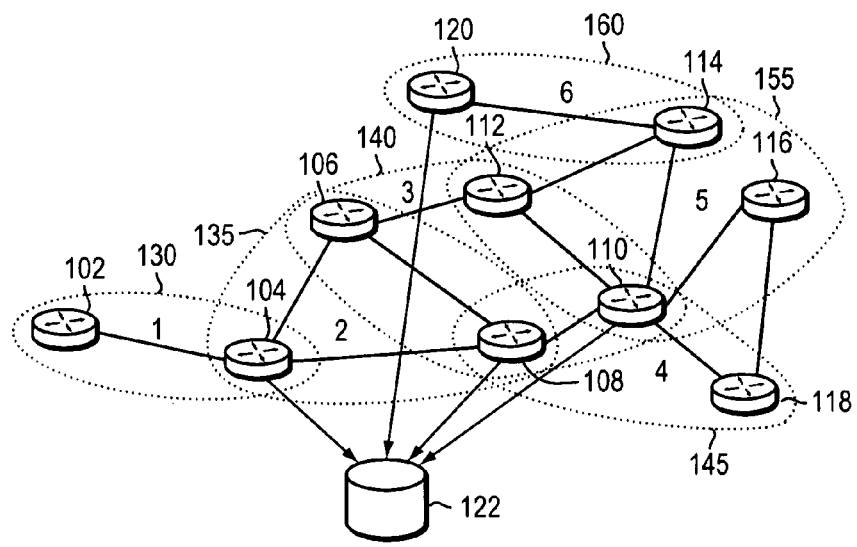

FIG. 1B illustrates a conventional method for subdividing the network elements into subgroups. In this case, information regarding the attributes of each managed element is provided to the management system 122, while status from selected managed elements within each subgroup is provided to the management system. Each subgroup performs an analysis operation and provides the results to the management system 122, which correlates the results of the analysis operation. Correlation is necessary as status indications may be provided from multiple subgroups when a failure or fault in an element in multiple subgroups occurs. For example, a failure in element 114 may produce failure or fault status indicators from elements 110 and 120.

Figure 2A:
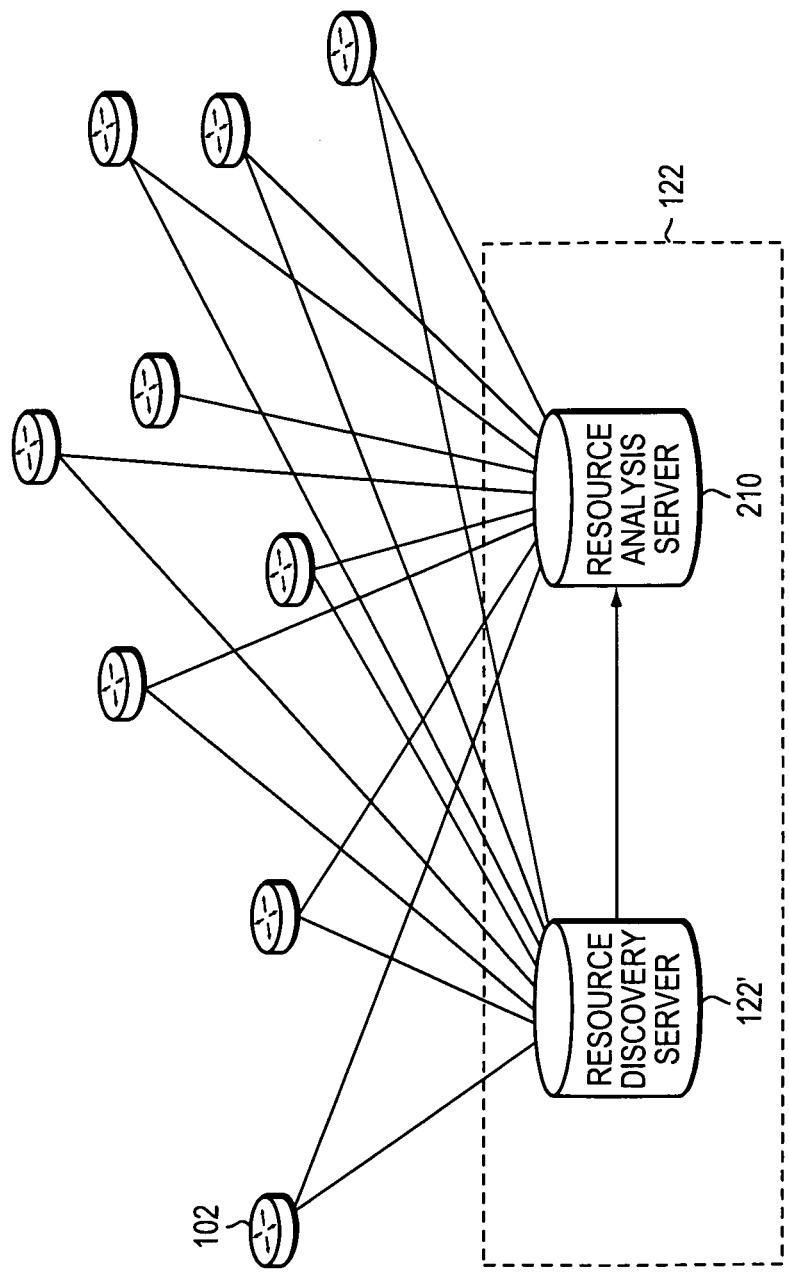
FIG. 2A illustrates a block diagram of a resource management system in accordance with the principles of the invention.

FIG. 2A illustrates a resource system network configuration in accordance with the principles of the invention. In this illustrated configuration, the resource management system 122 is composed of two distinct entities; a resource management system 122' and an analysis system 210. The resource management system 122' receives information regarding the characteristics or attributes of each of the managed elements and determines solely the resource topology. The analysis system 210 receives status information from each of the managed elements and performs an analysis in a manner similar to that previously described. As would be recognized, the resource may contain a significant number of elements of which selected ones may communicate with, or provide information to, the management system 122'. These select elements are referred to herein as managed elements. A managed element may include a software or code, i.e., beacon or agent that collects data or information associated with a device and provides this information to the management system 122'. From the information provided by the managed elements, the resource topology may be determined and maintained by management system 122'.

On the other hand, information regarding the network topology is required by the analysis system 210 to perform the analysis. Thus, in accordance with the principles of the invention, the management system 122' provides limited information regarding the resource or distributed system or application topology to the analysis system 210. With the determined topology and the status information, the analysis system may perform a desired analysis operation. The splitting of the topology determining operation and the analysis operation of the management system is advantageous as each operation requires less resources and the combination of the resources of the two operations is less than the resources required for the all-inclusive management system. The desired analysis operation may be root-cause analysis or an impact analysis. Additional operations that may be performed include fault detection analysis, fault monitoring analysis, performance analysis, congestion analysis, connectivity analysis, interface failure analysis, node failure analysis, link failure analysis, routing protocol error analysis, and routing control error analysis.

Figure 2B:
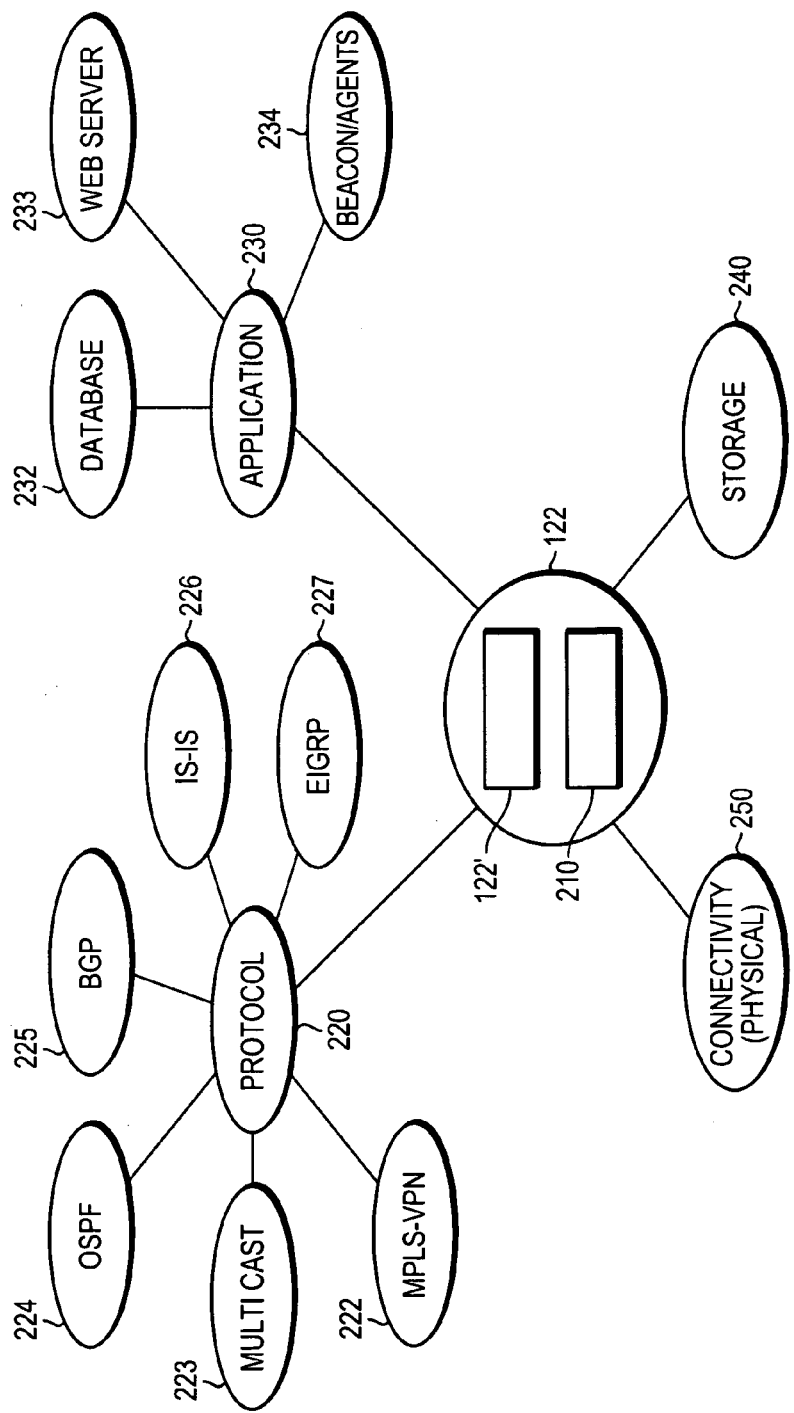
FIG. 2B illustrates a block diagram of the type of distributed systems to which the principles of the present invention may be applied.

FIG. 2B illustrates a block diagram of a plurality of distributed systems for which the principles of the present invention may be applied. The management system 122 may be applied to network protocols 220, applications 230, storage networks 240 and network connectivity 250. For example, with regard to network protocols the present invention may be applied to protocols such as MPLS-VPN 222, MultiCast 223, OSPF 224, BGP 225, IS-IS 226 and EOGRP 227. Each of these protocols is well-known in the art and need not be discussed herein. Although, the instant invention is illustrated and described with regard to its application to distributed system protocols, applications, storage network, and connectivity (FIG. 2B), it would be recognized that the present invention is not limited to its application to the illustrated elements. As would be further recognized, the terms distributed system and network are used interchangeable within and are considered synonyms of the term resource.

Figure 3A:
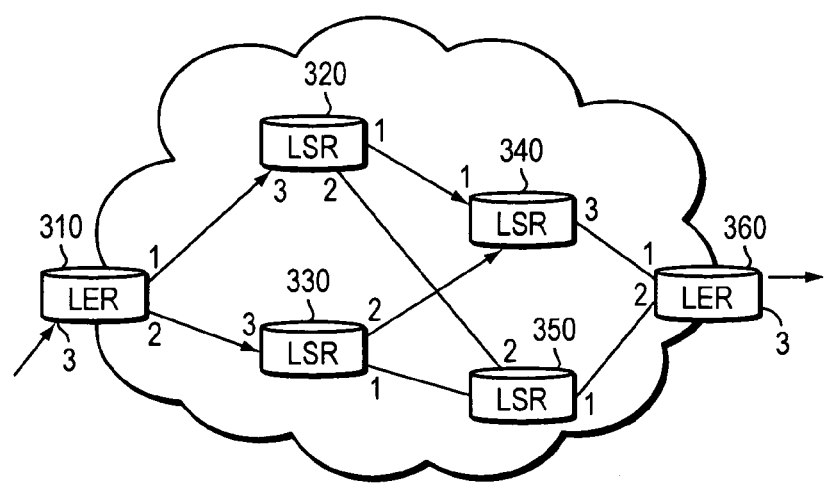
FIGS. 3A-3C illustrate application of the present invention to an exemplary conventional MPLS-VPN network protocol.
Figure 3B:
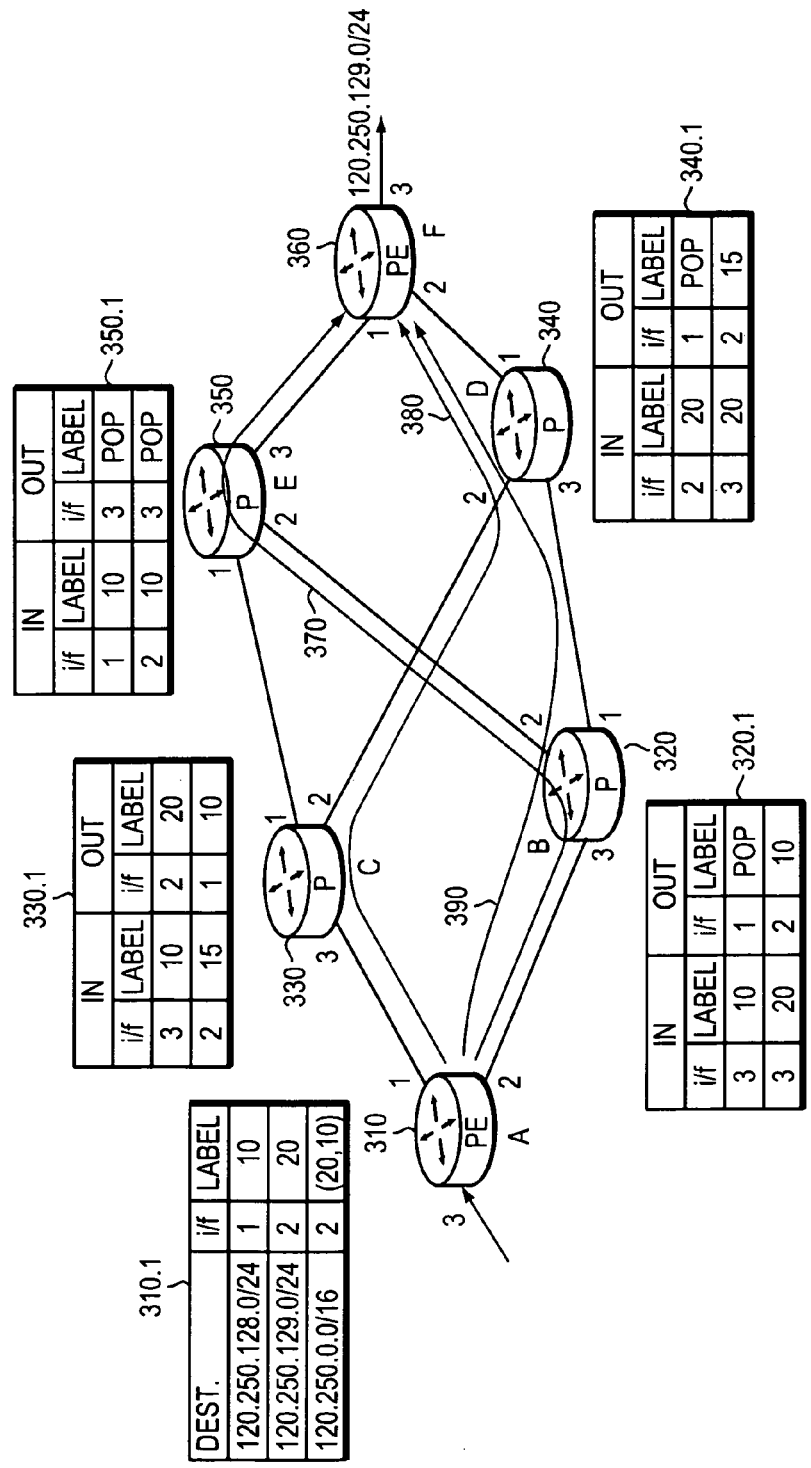
Figure 3C:
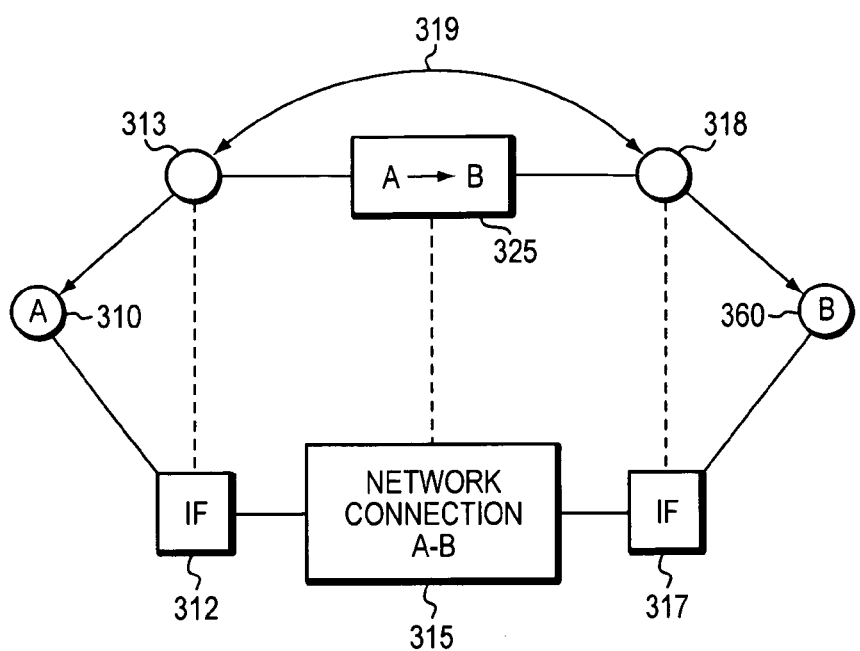

FIGS. 3A-3C provide an illustrative example of the operation of the present invention with regard to an MPLS-VPN network. FIG. 3A illustrates the operation of conventional MPLS network in an IP network. In this illustrated case, network 300 is composed of Label Edge Routers 310 and 360 and Label Switch Routers 320, 330, 340 and 350. Each router contains three ports for transmitting and/or receiving data or information items from a connected router. For example, LSR 320 is shown to receive data from LER 310 on its port 3 and transmit data to LSR 350 its port 2 and to LSR 340 via its port 1. Although LSR 320 is discussed and shown with regard to a unidirectional transmission, it would be recognized that the routers and the links between routers may be configured for bi-direction transmission and reception.

The Label Switch Routers, in this case, 320-350, represent the core MPLS nodes and contain routing tables that map the incoming label and incoming port information into an outgoing label and outgoing port. The incoming port is the identifier of the network interface at which the packet arrived while the outgoing port is the identifier of the network interface through which the packet will proceed to the next node. The Label Switch Routers base their forwarding decisions solely on the MPLS label and incoming port combination, without referring at any Layer 2 or Layer 3 through 7 header (of the well-known OSI protocol stack). Using a label swapping operation, the provider node replaces the MPLS label in the incoming packet with a new MPLS label in the outgoing packet and sends the new packet via the outgoing port. The path between one node and a second node is thus created by a sequence of MPLS labels and is referred to as a Label Switching Path (LSP).

The last router, i.e., Label Edge Router 360, in the LSP is a special case in that a new MPLS label need not be added to the address to forward the information. Thus, the LER 360, merely removes the MPLS shim and sends the resulting packet via the designated outgoing port. This functionality is well-known in the art and referred to a penultimate hop popping or PHP.

FIG. 3B illustrates, for each router shown in FIG. 3A, exemplary routing table relationships between the input port/MPLS label and the outgoing port/MPLS label to use for selected destination IP addresses. In this case, the Label Switch Router selects an outgoing MPLS label based on the desired destination, inserts the outgoing MPLS label as a shim in a packet header and sends the information items via the designated outgoing port. For example, information associated with IP addresses 120.250.129.0/24 provided on LER 310 port 3 proceeds via LSP 370 through routers 310, 320, 350 and 1360 based on the label binding routing tables 310.1, 320.1, 350.1 and 360.1. The destination Label Edge Router 360.1 does not require a routing table to retrieve the desired destination address. One skilled in the art would recognize that table 350.1 includes a "pop" label for information received on port 1, label 10. Use of a "pop" label is well-known to indicate that the node applying the "pop" label is the penultimate node and information items are forwarded to the ultimate node via the specified outgoing port. Table 310.1 further illustrates the use of MPLS label stack in that labels 10 and 20 are assigned to information destined for IP addresses 120.250.0.0/16. Although not shown in detail, the network shown in FIG. 3B includes two additional LSPs, 380 and 390.

FIG. 3C illustrates a representation of the LSPs shown in FIG. 3B. In this illustrated case, information regarding the characteristics and attributes of each of the network elements in the LSP path(s) from LER 310 to 360, e.g., ports, interfaces, LSP hops, hop tables etc. are represented as elements 312, 315, and 317. For example, element 312 may represent each of the interfaces for each of the elements in each of the paths. More specifically, element 312 may represent element 310, ports 1 and 2; element 320, ports 1 and 2; element 330, ports 1 and 2, etc. Similarly, element 315 may represent element 310, port 3; element 320, port 3, etc. The information associated elements 312, 315 and 317 include the attributes and characteristics of the network elements and are, thus, collected and stored in the resource management system 122'.

Element 319 logically represents the VPN including the LSPs contained therein, and element 325 logically represents the elements that comprise a specific LSP. Elements 313 and 318 represent the endpoints of the VPN and logically represent the interfaces at element 310 and 360. In the case of an MPLS system, only this limited amount of information is necessary to define the organization of each of the LSPs in the illustrated network. From this illustrate example, the limited amount of information regarding the VPN and associated LSPs need be provided to and stored in the analysis system.

Figure 4:
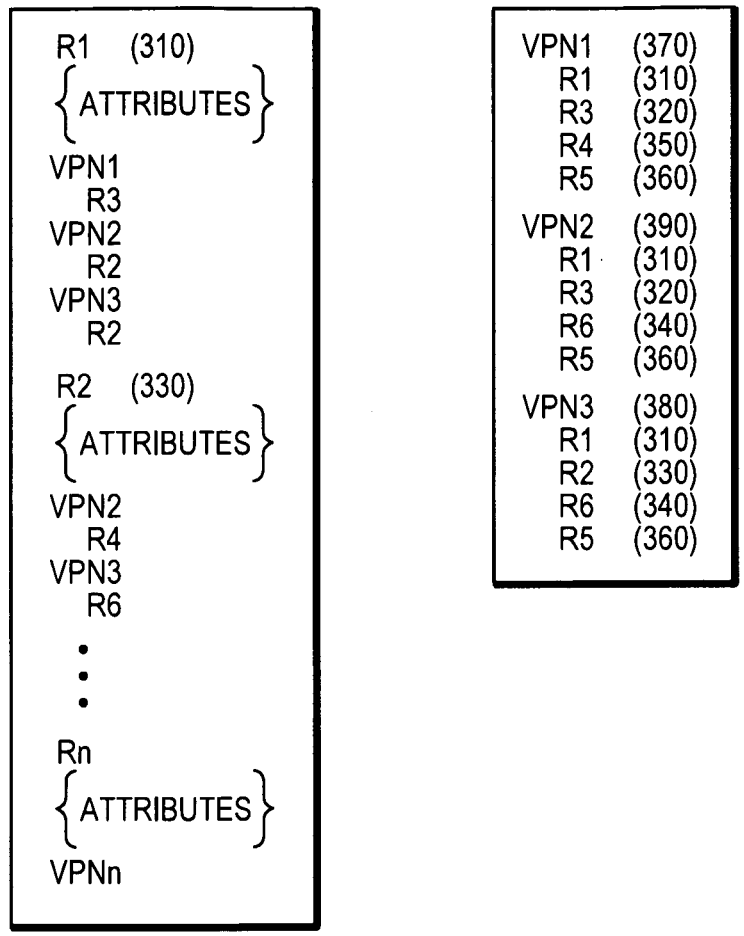
FIG. 4 illustrates data distribution of the MPLS protocol network shown in FIG. 3A in accordance with the principles of the invention.

FIG. 4 illustrates an exemplary distribution of information between resource management system 122' and analysis system 210 in accordance with the principles of the invention for the illustrated network shown in FIGS. 3A-3C. In this illustrated example, information associated with each of the network elements, 310, 320 . . . 360, is stored in a database or table 410 within the resource management system 122'. This information includes the attributes of each element, e.g., name, address, ports, etc. Also stored is information regarding the relationship of one element to another, i.e., the next hop associated with each of the plurality of LSPs associated with each MPLS configuration. Although not shown, it would be recognized that the resource management system 122' also includes further detailed information regarding the resources, e.g., MIBs, which is not illustrated.

A subset of the stored information contained in the resource management system 122' is provided to the analysis system 210. This subset of information is associated with the topology of the network and is shown in database or table 420. In this illustrated case, the information is limited to the LSPs (VPNs) and the elements that are contained in a particular LSP.

Figure 5:
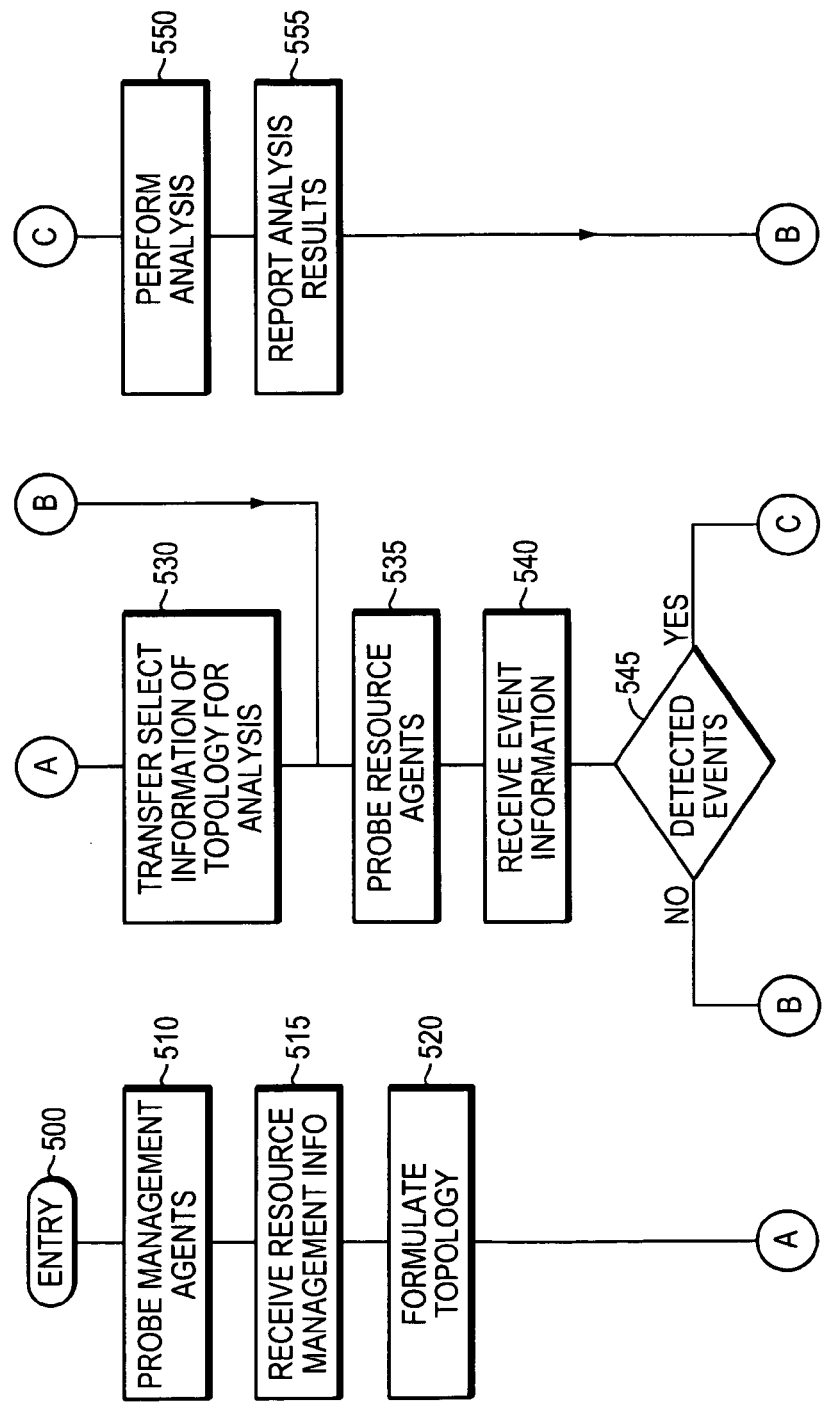
FIG. 5 illustrates a flowchart of an exemplary processing for a management system in accordance with the principles of the invention.

FIG. 5 illustrates an exemplary flowchart to execute to processing described herein. In this exemplary flowchart, the resource management system 122' probes the management agents stored on the managed elements in a distributed system at block 510. At block 515, the resource management system 122' receives information regarding the attributes and characteristics of the managed elements that host the management agents. At block 520, the resource management system 122' determines or formulates a topology based on the managed elements attributes and their relationships to one another. The topology may contain both information regarding the general operation of the network and more specific information with regard to characteristics of the distributed. For example, for the illustrated example shown herein, specific information regarding the VPNs within the general network topology may also be collected and stored.

At block 530, information specific to the topology is provided to the analysis system. At block 535, the analysis system probes the analysis agents (which may or may not be same as the management agents). At block 540, the analysis agents provide a response to the analysis server. It would be understood that the analysis agents may autonomously provide information to the analysis server. At block 545, a determination is made whether any events or responses have been detected by the analysis agents and provided to the analysis system. If the answer is negative, then processing continues request information from the analysis agents.

However, if the answer is positive, then an analysis is performed at block 550 to determine, for example, the root cause of the detecting of the events or responses. The analysis may be performed as described in the aforementioned US patents. The results of the analysis may then be presented or reported for subsequent processing at block 555. The processing continues to block 535 to continue probing the network analysis agents.

Figure 6:
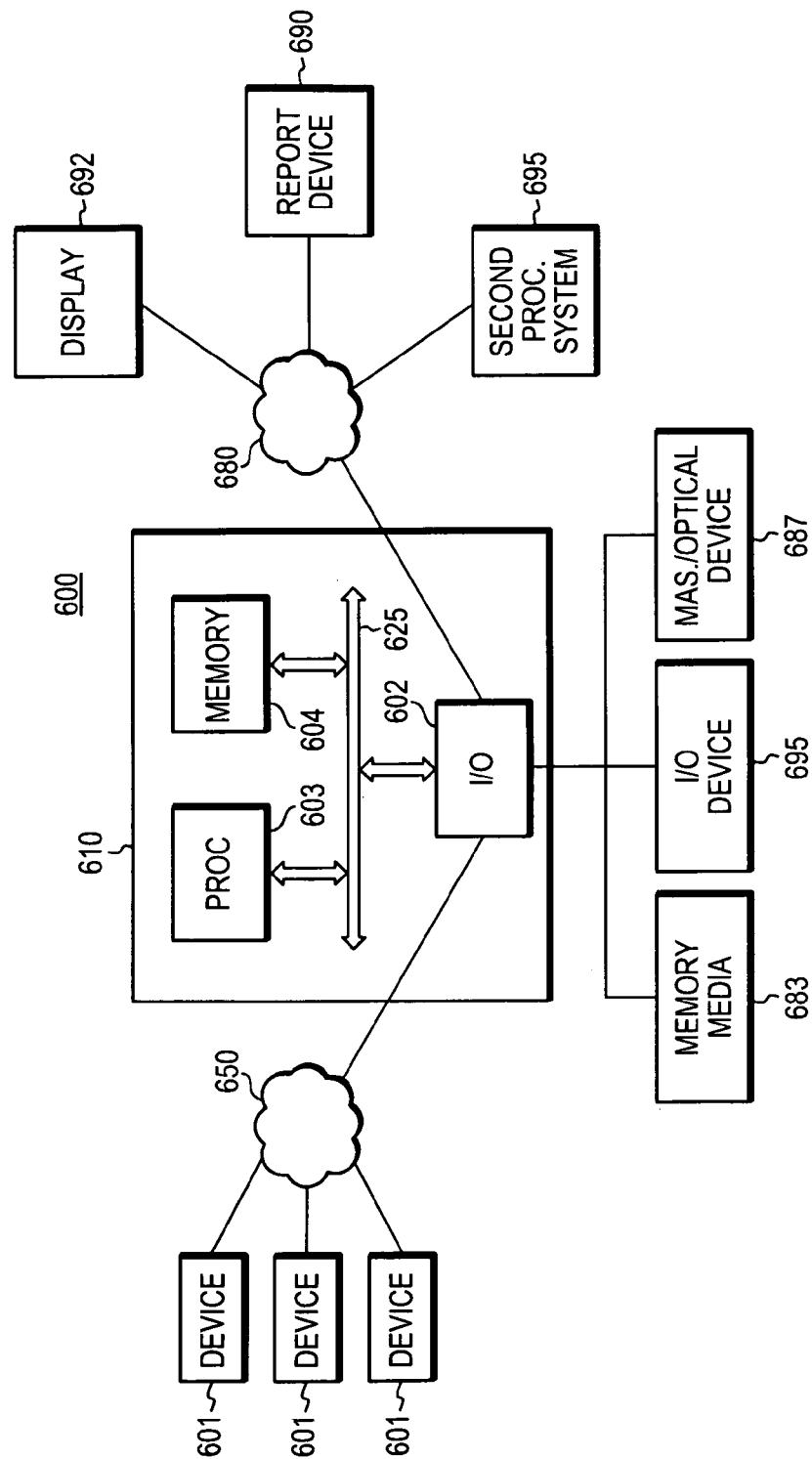
FIG. 6 illustrates an exemplary system for implementing the processing shown herein.

FIG. 6 illustrates an exemplary embodiment of a system 600 that may be used for implementing the principles of the present invention. System 600 may contain one or more input/output devices 602, processors 603 and memories 604. I/O devices 602 may access or receive information from one or more sources or devices 601. Sources or devices 601 may be devices such as routers, servers, computers, notebook computer, PDAs, cells phones or other devices suitable for transmitting and receiving information responsive to the processes shown herein. Devices 601 may have access over one or more network connections 650 via, for example, a wireless wide area network, a wireless metropolitan area network, a wireless local area network, a terrestrial broadcast system (Radio, TV), a satellite network, a cell phone or a wireless telephone network, or similar wired networks, such as POTS, INTERNET, LAN, WAN and/or private networks, e.g., INTRANET, as well as portions or combinations of these and other types of networks.

Input/output devices 602, processors 603 and memories 604 may communicate over a communication medium 625. Communication medium 625 may represent, for example, a bus, a communication network, one or more internal connections of a circuit, circuit card or other apparatus, as well as portions and combinations of these and other communication media. Input data from the client devices 601 is processed in accordance with one or more programs that may be stored in memories 604 and executed by processors 603. Memories 604 may be any magnetic, optical or semiconductor medium that is loadable and retains information either permanently, e.g. PROM, or non-permanently, e.g., RAM. Processors 603 may be any means, such as general purpose or special purpose computing system, such as a laptop computer, desktop computer, a server, handheld computer, or may be a hardware configuration, such as dedicated logic circuit, or integrated circuit. Processors 603 may also be Programmable Array Logic (PAL), or Application Specific Integrated Circuit (ASIC), etc., which may be "programmed" to include software instructions or code that provides a known output in response to known inputs. In one aspect, hardware circuitry may be used in place of, or in combination with, software instructions to implement the invention. The elements illustrated herein may also be implemented as discrete hardware elements that are operable to perform the operations shown using coded logical operations or by executing hardware executable code.

In one aspect, the processes shown herein may be represented by computer readable code stored on a computer readable medium. The code may also be stored in the memory 604. The code may be read or downloaded from a memory medium 683, an I/O device 685 or magnetic or optical media, such as a floppy disk, a CD-ROM or a DVD, 687 and then stored in memory 604. Or may be downloaded over one or more of the illustrated networks. As would be appreciated, the code may be processor-dependent or processor-independent. JAVA is an example of processor-independent code. JAVA is a trademark of the Sun Microsystems, Inc., Santa Clara, Calif. USA.

Information from device 601 received by I/O device 602, after processing in accordance with one or more software programs operable to perform the functions illustrated herein, may also be transmitted over network 680 to one or more output devices represented as display 685, reporting device 690 or second processing system 695.

As one skilled in the art would recognize, the term computer or computer system may represent one or more processing units in communication with one or more memory units and other devices, e.g., peripherals, connected electronically to and communicating with the at least one processing unit. Furthermore, the devices may be electronically connected to the one or more processing units via internal busses, e.g., ISA bus, microchannel bus, PCI bus, PCMCIA bus, etc., or one or more internal connections of a circuit, circuit card or other device, as well as portions and combinations of these and other communication media or an external network, e.g., the Internet and Intranet.

While there has been shown, described, and pointed out fundamental novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention.

It is expressly intended that all combinations of those elements that perform substantially the same function in substantially the same way to achieve the same results are within the scope of the invention. Substitutions of elements from one described embodiment to another are also fully intended and contemplated.

What is claimed is:

1. A method for providing scalability in a network resource management system the method comprising:
   receiving and storing information associated with each element of a plurality of managed elements, the managed elements selected from resources of a network, by a first resource manager system; wherein the information associated with each of the managed elements identifies the managed element and its relationship to selected ones of the remaining managed elements; wherein the first manager system is not one of the managed elements;
   determining, based on the information received associated with each of the managed elements, a topology of each of the plurality of managed elements from the received network element information by the first system;
   providing information regarding the topology of the managed elements to perform a root cause analysis from the first resource manager system to a second resource manager system; wherein the second resource manager system is not one of the managed elements;
   receiving at the second system information indicative of the status of each of the managed elements based on attempted communication between the second system to each of the managed elements;
   receiving at the second system the selected topology information from the first resource manager system; and
   performing, at the second system, an analysis of the plurality of managed elements based on the received topology and the received indication of status of the managed elements.

2. The method as recited in claim 1, further comprising: polling each of the managed elements.

3. The method as recited in claim 1, wherein the selected topology information is associated with the plurality of managed elements selected from the group consisting of: protocols, applications, storage networks and connectivity.

4. The method as recited in claim 3, wherein the selected topology information further selected from the group consisting of: BGP, IS-IS, EIGRP, MultiCast, OSPF and MPLS.

5. The method as recited in claim 1, wherein the status information represents at least one detectable event.

6. The method as recited in claim 5, further comprises:
determining a correlation between expected detectable events and associated causing events, wherein said correlation being based on the selected topology information; and
determining a mismatch measure between the received detected events and each of the at least one expected detected events; and
outputting the causing events associated with the expected detected events having the best mismatch measure.

7. The method as recited in claim 1, wherein the step of performing an analysis further comprises:
determining a correlation between at least one status information and associated causing information, wherein said correlation being based on the selected topology information;
determining a mismatch measure between received status information and each of expected at least one status information; and
outputting the causing information associated with the expected status information having the best mismatch measure.

8. The method as recited in claim 1, wherein the analysis is selected from the group from consisting of: fault detection, fault monitoring, performance, congestion, connectivity, interface failure, node failure, link failure, routing protocol error, routing control errors, and root-cause analysis.

9. The method of claim 7 wherein, wherein the selected topology information is MPLS.

10. The method of claim 1 wherein the receiving and storing information is from one or more management agents; and further wherein the receiving at the second system information regarding status of the managed elements is from one or more analysis agents.

11. A system for providing scalability in a network resource management system comprising:
a first resource manager apparatus comprising:
a processor in communication with a memory, the processor executing code for:
receiving and storing information associated with each element of a plurality of managed elements, the managed elements selected from resources of a network, by the first resource manager apparatus; wherein the information associated with each of the managed elements identifies the element and its relationship to selected ones of the remaining managed elements; wherein the first resource manager apparatus is not one of the managed elements;
determining, based on the information received associated with each of the managed elements, a topology of each of the plurality of managed elements from the received managed element information; and
providing information regarding the resource topology of the managed elements to perform a root cause analysis to a second resource manager apparatus via a communication link between the first resource manager and the second resource manager apparatus; wherein the second resource manager apparatus is not one of the managed elements;

the second resource manager apparatus comprising:
a processor in communication with a memory, the second resource manager apparatus processor executing the steps of:
receiving at the second system information indicative of the status of each of the managed elements based on attempted communication between the second system to each of the managed elements;
receiving the selected topology information from the first resource manager system; and
performing an analysis of the plurality of managed elements based on the received topology and the received indication of status of the managed elements.

12. The system as recited in claim 11, wherein the processors in each of the first and second apparatus execute the step of:
polling each of the managed network elements.

13. The system as recited in claim 11, wherein the selected topology information is associated resources selected from the group consisting of: protocols, applications, storage networks and connectivity.

14. The system as recited in claim 13, wherein the selected topology information is further selected from the group consisting of: BGP, IS-IS, EIGRP, MultiCast, OSPF and MPLS.

15. The system as recited in claim 11, wherein the status information represents at least one detectable event.

16. The system as recited in claim 15, wherein the processor in the second apparatus further executes the step of:
determining a correlation between expected detectable events and associated causing events, wherein said correlation being based on the selected topology information.

17. The system as recited in claim 16, wherein the analysis is performed in the second resource manager apparatus processor further executing the steps of:
determining a mismatch measure between the received detected events and each of the at least one expected detected events; and
outputting the causing events associated with the expected detected events having the best mismatch measure.

18. The system as recited in claim 11, wherein the analysis performed in the second apparatus processor further executing the steps of:
determining a correlation between at least one status information and associated causing information, wherein said correlation being based on the selected topology information;
determining a mismatch measure between received status information and each of expected at least one status information; and
outputting the causing information associated with the expected status information having the best mismatch measure.

19. The system of claim 17 wherein, wherein the selected topology information is MPLS.

20. The system of claim 11 wherein the receiving and storing information is from one or more management agents; and further wherein the receiving at the second system information regarding status of the managed elements is from one or more analysis agents.

* * * * *